United States Patent [19]

Yamada et al.

[11] 4,229,085
[45] Oct. 21, 1980

[54] FILM READER

[75] Inventors: Yu Yamada, Kokubunji; Mutsuhiro Inoue, Sagamihara; Toshio Arai; Kokichi Omi, both of Kawasaki; Hiroaki Suzuki, Hachioji; Tetsuro Kuwayama, Yokohama, all of Japan

[73] Assignee: Canon Kabushiki Kaisha, Tokyo, Japan

[21] Appl. No.: 884,536

[22] Filed: Mar. 8, 1978

[30] Foreign Application Priority Data

Mar. 10, 1977 [JP] Japan .......................... 52/28856[U]
Apr. 11, 1977 [JP] Japan ................................ 52/41092

[51] Int. Cl.³ ...................... G03B 21/22; G03B 21/60
[52] U.S. Cl. .................................... 353/75; 350/129; 353/77
[58] Field of Search ...................... 353/75, 97, 77, 78; 350/126, 127, 129

[56] References Cited

U.S. PATENT DOCUMENTS

| 2,726,573 | 12/1955 | Maloff | 350/127 |
|---|---|---|---|
| 2,934,998 | 5/1960 | Beard | 350/127 |
| 3,236,150 | 2/1966 | Miller | 350/127 |
| 3,718,078 | 2/1973 | Plummer | 350/129 |
| 3,781,102 | 12/1973 | Chandler | 353/75 |
| 3,997,258 | 12/1976 | Omi | 353/77 |

FOREIGN PATENT DOCUMENTS

| 1944365 | 3/1970 | Fed. Rep. of Germany | 350/128 |
|---|---|---|---|
| 1946680 | 5/1970 | Fed. Rep. of Germany | 350/126 |

Primary Examiner—Steven L. Stephan
Attorney, Agent, or Firm—Fitzpatrick, Cella, Harper & Scinto

[57] ABSTRACT

This invention presents a film reader equipped with a reflecting type screen, which is arranged in a housing of the reader and has a number of ring strip surfaces having different inclination angles and arranged concentrically. The common center of the ring strip surfaces is deviated from the center of the screen and located outside of the screen, and the end of the screen nearest to the common center is placed near an observing aperture in the housing. A light source for illuminating a microfilm having recorded images and an optical system for projecting the image of the illuminated film to the screen are provided. Further, the screen is formed by one synthetic resin or preferably at least two kinds of synthetic resins having different refractive indices and mutually nonsoluble property. A reflecting substance may be mixed with said resins.

9 Claims, 10 Drawing Figures

FILM READER

BACKGROUND OF THE INVENTION

1. Field of the Invention

This invention relates to a film reader equipped with a reflecting type screen.

2. Description of the Prior Art

Film readers, which enable observation of an enlarged image projected on a screen of the image recorded on a microfilm, are classified into two kinds according to the type of the screen to be used. One kind of film readers uses the so-called transmitting type screen comprising a transparent glass plate or synthetic resin plate provided with a photo-diffusion layer on one surface thereof. This kind of reader is called a transmitting type reader by which an image on a microfilm is projected on one side of said transmitting type screen and a light image transmitted the screen is observed from the opposite side of the screen. The other kind of reader is called a reflecting type reader which uses the so-called reflecting type screen similar to a movie screen. An image on a film is projected on said screen, and a light image reflected by the screen is observed from the same side of the projecting surface. The reflecting type reader is more attractive than the transmitting type reader as it is easier to see a projected image than a transmitted one. In the former type film reader, an observer is able to see a projected image well enough to read printed matter such as a book, etc. However, the reflecting type film reader does not always give the most suitable projected image, because it is inevitable that the contrast of a projected image will be deteriorated by peripheral external light other than an image projecting light incident on the screen, and further there has been no satisfactory device to reduce the influence of such external light. In the conventional reflecting type film reader, a large aperture for observation is provided at a portion of a square housing and a screen provided within the housing is observed through said aperture, so that when the reader is used in a light place, a light external of the reader comes into the housing through the aperture and impinges on the screen, and this incident light goes toward the eyes of the observer, who will then observe both of the image light and this peripheral light. As a result, the contrast of the image becomes significantly degraded and the brightness of the image becomes non-uniform because the light before the screen and inside of the screen on which the peripheral light impinges are different from each other.

According to the conventional reflecting type film readers, there have been proposed the combination of a screen having a high light diffuse-reflection characteristic with an external light control filter; or a high brightness screen having a specific uneven surface of a dotted or line form to reflect a part of the light to a certain direction; or the light brightness screen having a curved screen surface so as to keep the intensity of the light reflected by the screen high relative to the external light. However, the screen combined with a filter is limited in its effect because the intensity of an image projection light is limited, and an obtained image is degraded due to a ghost produced by a light reflected by the filter surface. And the high brightness screen produces partially bright points so that a strong glittering phenomenon occurs, which causes deterioration of the image quality and fatigue of the observer's eyes. These disadvantages are counted as defects in the conventional reflecting type microfilm readers although they are easy to observe.

SUMMARY OF THE INVENTION

An object of the invention is to overcome said defects and to provide a film reader having an improved lightness and image contrast.

Another object of the invention is to provide a film reader which enables an observer to see an image projected on a screen in a comfortable position and which gives a high quality image to be read even in a light place.

A further object of the invention is to provide a film reader substantially reducing the influence of a peripheral light incident on the screen so as to give a projected image of a uniform brightness.

Another object of the invention is to provide a film reader which enables observation of an image projected on the screen in a relatively wide field and which does not produce an image distortion which would result in a problem in practical use.

A further object of the invention is to provide a film reader having a relatively large aperture in the housing for observing the screen, the surface of which can be easily cleaned.

The invention will be explained in detail with respect to embodiments shown in the drawing.

DESCRIPTION OF THE PREFERRED EMBODIMENTS

Figure 1:
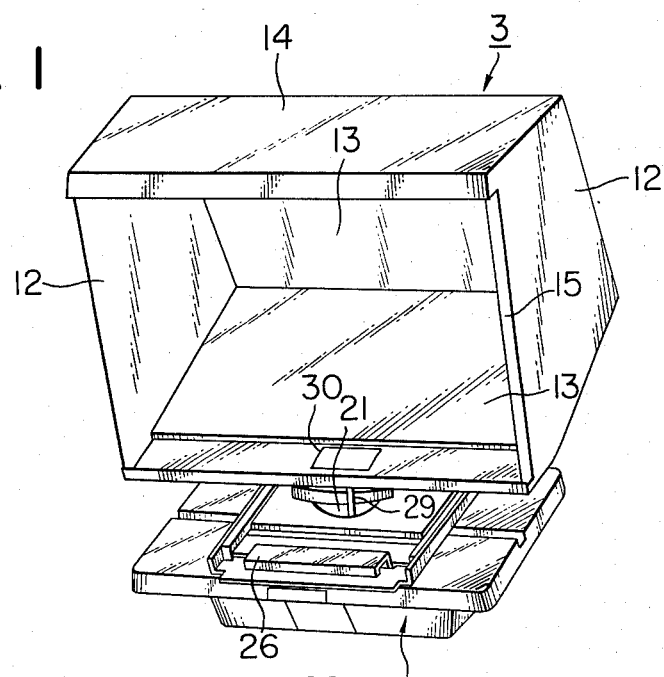
FIG. 1 shows a perspective view of a film reader embodying the invention.
Figure 2:
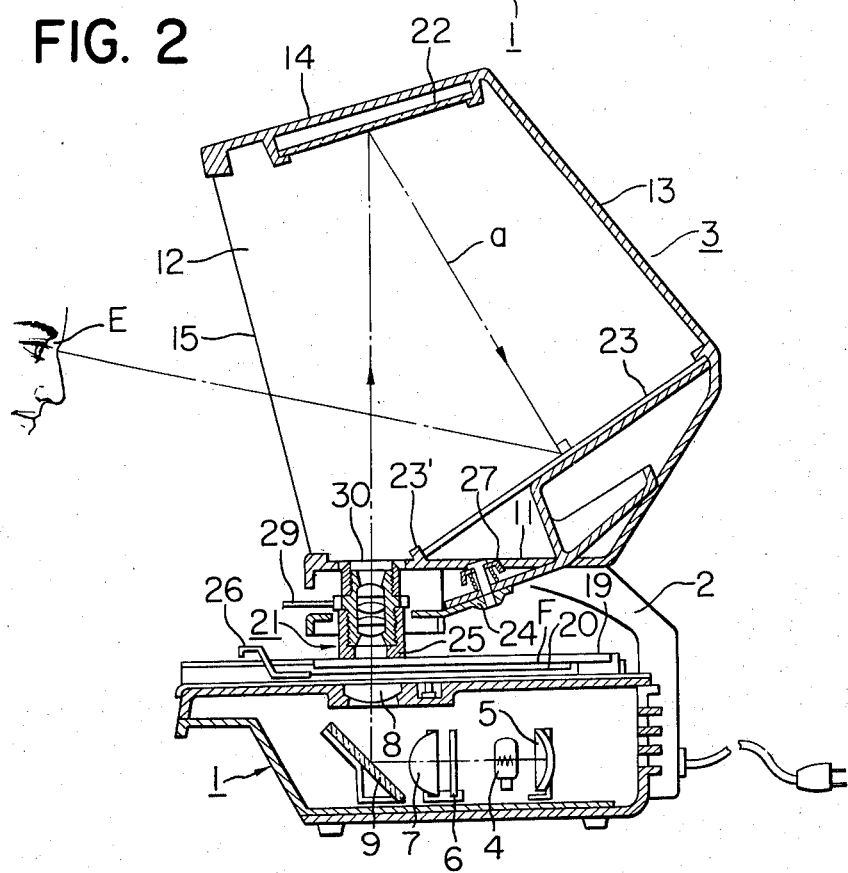
FIG. 2 shows a cross section of the reader shown in FIG. 1.

FIGS. 1 and 2 show an embodiment of the microfilm reader of the present invention.

The film reader comprises a hollow lower housing 1 and a hollow upper housing 3 supported on the lower housing 1 by a leg 2. Within the lower housing 1, there are an illuminating lamp 4 for example, a halogen lamp, a spherical mirror 5 effectively reflecting the light coming from the lamp 4, an insulating glass 6, condenser lenses 7 and 8, and a mirror 9, which directs upwardly the light from the lamp 4, all arranged as shown and these elements constitute an optical system for illuminating a microfilm.

The upper housing 3 is a rectangular housing comprising a bottom wall 11 fixed to the leg 2, opposite side walls 12 integrally formed with the bottom wall 11, a rear wall 13 and a top wall 14 integrally formed with the side walls 12 and the rear wall 13. And in a front side wall of the housing 3 there is provided an observing aperture 15 largely opened to the outside. A reflecting mirror 22 and a reflecting type screen 23 are arranged in the housing 3, and the housing 3 forms a hood covering the surroundings of the screen 23. An observer located at a predetermined distance from the housing 3 can observe the screen 23 through the aperture 15. A projecting lens 21 is mounted on the bottom wall 11 of the housing 3 for focusing an image of a microfilm on the screen 23 through the reflecting mirror 22. On the top surface of the lower housing 1, a movable fiche carrier 26 is provided, the carrier having two plane glass plates 19 and 20 sandwiching therebetween a microfiche F. By moving the carrier 26, a specific image in a microfiche can be placed at a position to be illuminated by the light from the lamp. An arm 24 is arranged at the lower portion of the bottom wall 11 for supporting a cylindrical lens barrel 25 constituting a lens assembly 21. A spring 27 presses the arm 24 downwardly so that the lower end surface of the lens barrel 25 is press-contacting with the upper glass plate 19 of the carrier 26. Thus the distance between the film and the lens is always constant and the film is maintained at the focussing position even when the carrier is moved. A lever 29 is provided for adjusting the focus.

An aperture 30 is provided in the bottom wall 11 in a position corresponding to the lens assembly 21. The light from the lens assembly 21 passes through this aperture 30 to the reflecting mirror 22 and is projected on the screen 23 and incident onto the eyes E of an observer. The distance between the centre of the screen 23 and the eyes E is less than twice as much as a usual distance of distinct vision, i.e. 25 cm. In FIG. 2, a shows a projection optical axis.

Figure 3:
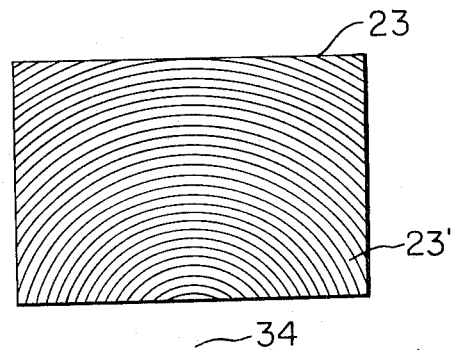
FIG. 3 shows a front view of the screen used in the reader of FIG. 1.
Figure 4:
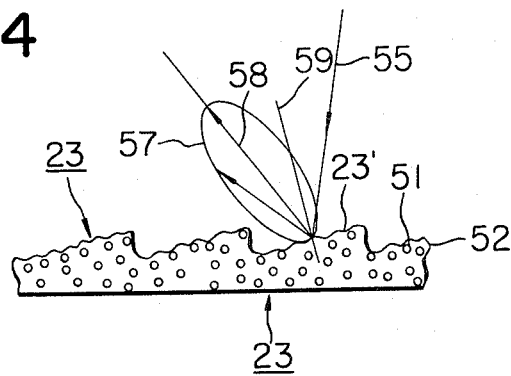
FIG. 4 shows a cross section of the screen.

FIGS. 3 and 4 shows the screen 23 used in the embodiment of FIGS. 1 and 2. The surface of the screen 23 is formed as a Fresnel surface where a number of inclined surfaces are arranged to condense the light reflected by the screen within a certain area and is formed as a light diffusion surface or formed by a light diffusion substance for diffusion-reflecting the incident light in a suitable light-orientation state. The Fresnel surface of the screen 23 corresponds to the Fresnel surface of a Fresnel type concave lens and consists of a plurality of ring strips concentric with each other with the center 34 of the Fresnel optical axis as the common center. The inclinations of the ring strip surfaces on the same circles relative to the center 34 of the optical axis are the same, the inclination of each ring strip is different in such a manner that the ring strips departing from the center 34 have larger inclination angles. Each ring strip of the Fresnel surface is set to have an inclined surface to make the pupil of the projecting lens and the observing position E to have an approximate conjugate relation with respect to the reflecting surface so as to direct the light coming from the projecting lens assembly 21 and reflected by the reflecting mirror 22 to the observing position outside of the housing. Further, the surface is formed as an elliptical Fresnel surface or a spherical Fresnel surface so as to condense the main reflected light coming from each of the Fresnel inclined surfaces consisting the whole screen surface at a position having a distance less than twice as much as the distance of distinct vision from the center of the screen. The Fresnel surface of the screen reflects the projected light effectively toward the observing position so that the whole screen surface as viewed from the observing position is brightened and is made as a high quality image surface. On the other hand, the light coming externally of the projecting lens is reflected to the direction outside of the observing position and the influence of the light incident from the observing side to the image is significantly reduced so that a good image contrast is maintained.

The substance of the screen has a light diffusion-reflecting property for obtaining a suitable reflecting light orientation characteristic taking the distance between two eyes of an observer and the field of the moving eyes into consideration.

In the above explained microfilm reader, the image projecting light incident on the screen 23 from the projecting lens is reflected and oriented toward the observing position located outside of the housing from the observing aperture 15 of housing 3, while the most of the external light incident on the screen surface 23 from outside of the housing is reflected to the inside of the housing so that the most of the reflected light toward the observing position from the screen is occupied by the image light component and the image on the screen is hardly effected by the external light. Consequently, even when the reflecting type microfilm reader of the invention is used in a light place, it is possible to maintain the high quality and high contrast image.

The contrast of the enlarged image projected on the screen is determined fundamentally by the projection and focussing relation due to the quality of the projecting lens etc., and by the light component coming from outside of the projecting lens.

The contrast determined fundamentally by the projecting system is set to Vo and the actual contrast containing the change component due to the external light is set to V. Then, $$Vo = (Imax - Imin)/(Imax + Imin)$$

$$V = (Imax - Imin)/(Imax + Imin + 2I_D),$$

where Imax is the intensity of the light component in the observing direction of the light area of the image, Imin is that of the dark area of the image, and $I_D$ is the intensity of the light component in the observing direction of the light coming externally of the projecting lens.

It becomes clear from the above relations, the intensity of the external light incident on the screen will significantly affect the image contrast. Assuming that Imin=0 and therefore Vo=1, which shows the best quality image, and the screen is of a quality nearly to a perfect diffusion surface, when the external light of $I_D=5$ Imax is incident on the screen, a very bad contrast image of $V = 1/11 \doteq 0.09$ is obtained.

In a screen of a Fresnel type reflecting surface having a good reflecting directivity, the reflecting component of the light directed to the observing position from the observing aperture is small as explained in the foregoing, the deterioration of the contrast due to the external light is reduced. In a Fresnel reflecting screen using a light diffusive substance of the light orientation property shown by the curve D of FIG. 9, described hereinafter, under the condition of angle 30+ formed by the projecting light and the main light reflected by that surface, the rate of the light orientation component relative to the peak is 0.135, then $I_{DO}=5$ Imax, where $I_{DO}$ is the intensity of the external light incident on the screen, and $I_D=0.135$ $I_{DO}$, so that V=0.67, which is about 7.5 times the contrast obtained by the screen having the surface nearly to the complete diffusion surface explained in the foregoing. Actually most of the external light is not a spot light source, but, according to this invention, a high contrast and high quality image is obtained.

Further, by suitably selecting the positional condition among the body of the microfilm reader, the housing covering the screen and the observing aperture, a high contrast and high quality projected image can be observed by an observer located at a comfortable position. By considering the height of a desk on which the reader is placed and the position of an observer, firstly the inclination angle of the screen relative to the horizontal plane is set between 20° and 40°, and secondly, the optical axis of the projecting lens incident onto the screen is set to cross perpendicularly the surface of the screen, and the angle formed between the projecting optical axis and the main reflected direction of the axial light reflected by the inclined Fresnel surface is set between 30° and 45°, an observer can observe a high quality image within a relatively wide field in a comfortable observing position set outside of the reader.

When the inclined angle of the screen is less than 20°, the screen becomes too close to the horizontal line, the housing constitutes an obstacle for the observation and the screen falls too much to observe the reader from outside of the reader placed on the desk by an observer sitting in the natural position, which results in distortion of the image. When the inclined angle of the screen is beyond 40°, for raising the screen maintaining the necessary light path length, the device becomes big while the observing aperture provided in the housing becomes small, and moreover, the size of the reflecting mirror for bending the optical axis becomes big so that the cost is increased.

The second condition above mentioned is important for effectively reflecting and orienting the projected light image, which is projected on the screen, outside of the housing. Specifically, in the conventional reflecting type microfilm readers, it was usual to project the light approximately perpendicular to the screen, most of the light reflected by the screen coming inside of the housing so that the reflected light will be reflected again by the inner walls of the housing and the mirror arranged inside of the housing so as to illuminate again the screen, and therefore, the construction of the device itself causes to contrast deterioration.

However, according to the present invention, almost all of the projected lights exits outside of the housing due to the Fresnel screen, said defects peculiar to the conventional devices can be removed. Consequently, a higher contrast and higher quality image is obtained than the conventional device under the condition where the external light will be coming into the housing or where the external light will not be coming into the housing, which is the ideal condition.

As shown in FIG. 3, the central axis 34 of the Fresnel screen, which is the common center of the concentric ring strips, is located outside of the screen 23, and the end of the screen 23 closest to the central axis 34 is placed at a position near to the observing aperture 15 of the housing. In case of a Fresnel screen in which the Fresnel center is located within the screen, the observing position becomes inevitably high, so that an observer must take a poor posture which causes fatigue, and moreover, the angle formed by the projecting optical axis and the main reflecting light of the light along the projecting optical axis becomes small due to the great inclination angle of the Fresnel surface so that the selectivity of the reflecting light is small to deteriorate the contrast of the image. The inclined surface of the saw teeth shaped cross section of the usual Fresnel consists of the effective area and the remaining ineffective area which is the riser portion located at the interfaces between the adjacent ring strips, and in the optical system using a big eccentricity, said riser portion causes the disturbance of the image. Especially, in the reflecting type microfilm reader, the external light incident through the observing aperture from the observing side will impinge on the riser portion of the Fresnel and this is brightened to disturb the image. This is significant at a portion close to the observing aperture, which portion is most important for obtaining a good contrast image. Therefore, quality of the image of the portion, which must be seen most clearly, is deteriorated.

According to the present invention, in which the Fresnel center locates outside of the screen, it is possible to produce two screens from one concentric Fresnel with the aid of a single mold for mass-producing the fine Fresnel surface structure, which is an economical advantage. Further, since the Fresnel grooves formed in the Fresnel surface of this invention have no portion connecting to the circles, any dust or foreign matter on the grooves can be easily swept away along the grooves.

The screen 23 is, as shown in FIG. 4, made of a mixture of fine particles 51 of a light reflecting substance and a synthetic resin substance 52, and the surface of the screen is formed as a Fresnel surface for reflecting the incident light to a predetermined direction, and the Fresnel surface is provided with fine rugging to diffuse the incident light. In FIG. 4, the light 55 incident on the screen 23 is partially reflected by the screen surface but most of the light 55 enters into the inside of the screen substances where the light is diffusion-reflected to exit from the Fresnel surface. The light orientation property of this light exiting from the surface, i.e. the reflected light by the screen, is determined by probability because of the internal diffusion, but this varies by the sort of the synthetic resin and mixing ratio of the synthetic resin and the reflecting substance, and the peak of the exiting light is approximately in the positive reflecting direction. In FIG. 4, the elliptic body 57 shows the distribution state of the diffusion of the exit light, and the arrows shown in the elliptic body represent the directions and the intensities of the reflected light, respectively, among which the light represented by the arrow 58 is strongest. In FIG. 4, 59 is the normal direction of the reflecting surface.

In the above screen, the activity of the diffusion for utilizing it in the reflecting type screen is obtained by the diffusion-reflection inside of the screen substrate so that for avoiding the concentration of the light reflected by the surface of the substrate to occur in the direction of the eyes of an observer, the fine ruggings of 1/10 to 1/20 of the width of the inclined surface of the Fresnel should be provided. This width of the inclined surface corresponds to the pitch of the ring strips and is set to be less than 0.2 mm in taking the distance of distinct vision and the eye-sight into consideration.

The light orientation property of the screen is controlled by the synthetic resin constituting the substrate of the screen and the mixing ratio of the synthetic resin substance and the reflecting substance. As the synthetic resin, an individual or the mixture of at least two kinds of resins, which are non-soluble with each other, is used. In case of the latter, by selecting the mixing rate of synthetic resins, it is possible to reduce the amount of reflecting substance to be mixed, and in this case, a screen having a preferable diffusion characteristic is obtained. Further a transparent or a semi-transparent synthetic resin is used, and when a semi-transparent or translucent synthetic resin of a transmittivity of less than 60% per 0.2 mm is used, the rate of the reflecting substance can be significantly reduced compared to the case where a transparent synthetic resin is used.

The mutual non-solubility relation of various kinds of the synthetic resins is shown in the following table.

|  |  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| polystyrene | 1 |  | O | O | O | O | O | O | O | O | O | O | O | O | O | X |  |
| polymethacrylic acid methyl | 2 | O |  | O | O | O | O | O | X | O | X | O | O | O | O | O | O |
| polymethacrylic acid ethyl | 3 | O | O |  | X | O | O | O | O | O | X | O | O |  | X | O | O |
| polymethacrylic acid n-propyl | 4 | O | O | X |  | X | X |  | O | O | X | O | O |  | X | O | O |
| polymethacrylic acid n-buthyl | 5 | O | O | O | X |  | X |  | O | O | X | O | O |  | X | O | O |
| polymethacrylic acid isobuthyl | 6 | O | O | O | X | X |  |  | O | O | X | O | O |  | X | O | O |
| polyacrylic methyl | 7 | O | O |  |  |  |  |  | X | O | X | O | O |  |  |  |  |
| polyacetic acid vinyl | 8 | O | X | O | O | O | O | X |  | O | X | O | O | O |  | O |  |
| acetic acid cellulose | 9 | O | O | O | O | O | O | O | O |  | X | O | O |  |  |  |  |
| cellulose nitrate | 10 | O | X | X | X | X | X | X | X | X |  |  |  |  | O |  |  |
| ethylcellulose | 11 | O | O | O | O | O | O | O | O | O |  |  | O |  |  |  |  |
| benzyl cellulose | 12 | O | O | O | O | O | O | O | O | O |  | O |  |  |  |  |  |
| polyvinyl chloride | 13 | O |  |  |  |  |  | O | O |  |  |  |  |  |  |  |  |
| cumarone resin | 14 | X | O | X | X | X | X |  |  | O |  |  |  |  |  |  |  |
| polyisobuthylene | 15 | O | O | O | O | O | O |  | O |  |  |  |  |  |  |  |  |
| polycarbonate | 16 |  | O | O | O | O | O |  |  |  |  |  |  |  |  |  |  |

X : soluble, O : non-soluble

In the above table, round (O) marked resins are to be mixed, and especially, the combination of polycarbonate, polyvinyl chloride and acrylic resins provides a good result. The resins having great difference in refractive index should better be combined to obtain a good screen property. In case of combining resins mutually non-soluble and having different refractive indices, it is possible to obtain an arbitrary internal diffusion-reflection characteristic substrate due to the difference in refractive index without mixing a reflecting substance.

When the rate of light reflecting substance to be mixed in the synthetic resin is increased, the reflecting layer or part of the reflecting substance is formed at the position near to the top surface of the screen, and in an extreme case, each of the reflecting substances be closely arranged at the near portion of the screen surface, the light reflected by the screen becomes the light orientation state concentrated at the extremely narrow area around the positive reflecting direction. Thus by suitably selecting the ratio of mixing it is possible to obtain a reflecting screen having a suitable light orientation property.

When the mixing ratio of light reflecting substance is decreased, the light enters deeply into the screen substance and by the repetition of the internal reflections, flare of the light occurs so that in case of decreasing the mixing rate of reflecting substance it is better to use the aforementioned synthetic resins.

According to the experiments, in view of the resolving power, the depth of the light entering into the substrate should be 0.1 mm–0.2 mm, and the attenuation of the light per 0.2 mm of the thickness of the substrate should be 90–95% to obtain a clear screen having less flare.

It is possible to color the screen by mixing dye or pigment in the screen substances.

Figure 5A:
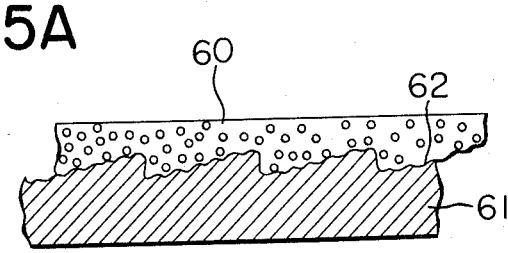
FIGS. 5A and 5B illustrate methods of producing said screen.
Figure 5B:
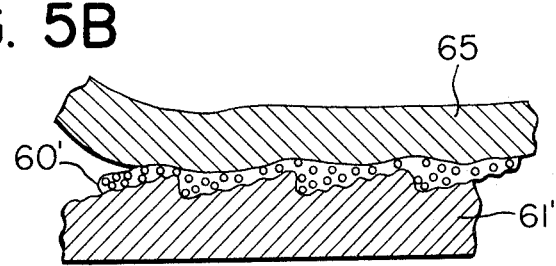

FIGS. 5A and 5B shown processes for the screen explained in the foregoing. In FIG. 5(A), a light reflecting substance such as aluminum particles or powder is uniformly dispersed in the synthetic resin melt of, for example, acrylic resin, and the resulted melt 60 is put onto the mold 61, which has the shape of a surface opposite to the Fresnel surface of a Fresnel concave lens, and each of the inclined surfaces is of a fine rugging surface 62. The sheet obtained after cooling the heated melt 60 is separated from the mold to provide the screen. The light image is projected on the back surface, which is faced to the mold 61, of the sheet and the screen is observed from the same side as the image was projected.

In FIG. 5(B), similar mixing melt 60' was coated as a thin layer on the similar mold 61' and a supporting body 65 is overlaid on the mold 60' and after cooling, the thin sheet 60' and the supporting body 65 are integrally separated from the mold 61' to obtain the screen. For improving the separation, the surface of the mold 61' should better be coated by an agent such as Teflon, i.e., ethylene fluoride resin for aiding the peeling off of the sheet. It is possible to form firstly the thin sheet 60' and then supporting body 65 is put on the sheet 60' by using an adhesive. According to the method of FIG. 5(B), the thin layer of the mixed melt 60' is obtained so that only a short time is required for cooling, and moreover, a continuous flexible sheet can be obtained so that it is suitable for a mass-production at a less expense. Further, even when an uneven thickness of the sheet is obtained, the back surface of the separated sheet is formed as a faithful Fresnel surface so that there is no problem. In any case, each of the ring strip reflecting surfaces of the screen is formed to have a predetermined correct inclined angle, the screen having a definite quality and property can be easily produced.

As a light reflecting substance, nickel, chromium, aluminum oxide ($Al_2O_3$), barium sulfate, zinc oxide, magnesium oxide, etc. is used in the form of a fine cube, spherical or thin piece.

Figure 6:
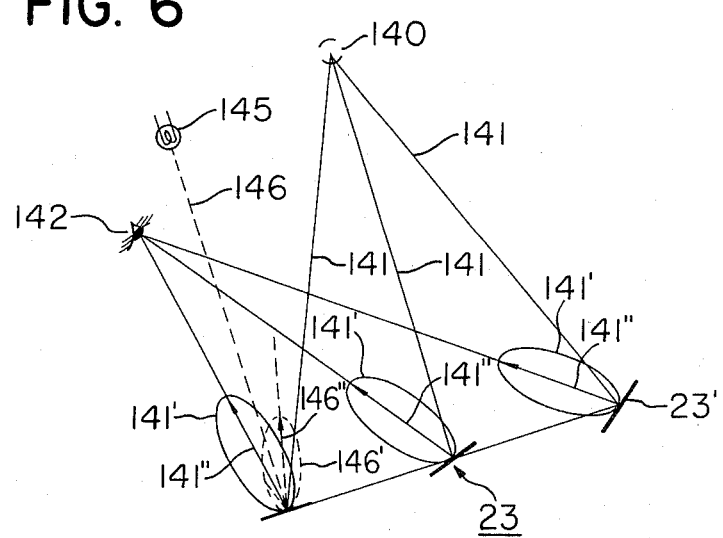
FIG. 6 is a diagram useful in explaining the light orientation state of the screen.

FIG. 6 shows the state of distribution of the light diffused and reflected by the screen of the light incident into the screen, in which 140 represents the position of the pupil of the lens, 142 the eyes of an observer, 145 peripheral light source outside of the housing of the reader. The incident light 141 from the pupil 140 is diffused and reflected by each of the ring strips 23' of the screen 23, and the reflected light is distributed as represented by the elliptic body 141' shown by real lines and the reflected main light 141" having the highest intensity among the exit lights from the ring strips 23' enters into the eyes 142 of the observer positioned at the standard location. Thus the intensity of the light directed to the observer is substantially increased and the whole surface of the screen becomes uniformly and greatly lightened. On other hand, the incident light 146 from the external light source 145 is diffused and reflected by each of the ring strips 23' and the reflected light is distributed as shown by the elliptic body 146' of the dotted line. Thus the reflected main light component 146" having the highest intensity among the exit light from each of the ring strips 23' is not directed to the eyes of the observer so that the ratio between the image light and the external light among the reflected light components directed to the observing side becomes small compared to the actual rate of the intensity of the light incident on the screen and a good contrast projected image can be obtained.

Figure 7:
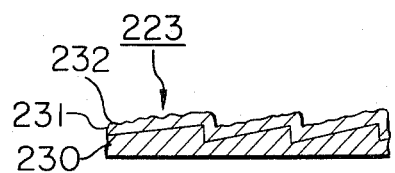
FIGS. 7 and 8 show cross sections of other embodiments of the screen, respectively.
Figure 8:
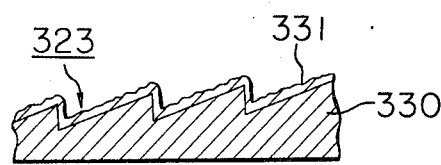

The screens shown in FIGS. 7 and 8 represent other embodiments, respectively. The screen 223 shown in FIG. 7 provides rugging layer 231 on the surface of the substrate 230 having a surface corresponding to the Fresnel surface of Fresnel type concave lens. On the surface of the rugging layer 231, a thin light reflecting surface 232 is provided. This screen comprises a substrate formed with thick paper, metal and synthetic resin etc., on which the Fresnel surface is formed and the paint having fine particles of $TiO_2$, $SiO_2$ and $ZnO$ etc., is uniformly coated along the Fresnel surface and dried to form on the surface the fine rugging. On this coated surface, the reflective metal of, for example, aluminum is deposited to form a thin layer to obtain the screen. The surface of the light reflecting layer 232 has the fine rugging by the fine particles of the inner layer to have a diffusion property necessary for the screen.

The screen 323 shown in FIG. 8 provides the light diffusion layer 331 on the surface of the substrate 330 comprising Fresnel type concave mirror. This screen is formed by coating a paint having fine particles of light diffusive material on the surface of Fresnel type concave mirror and drying it. It is also possible to obtain the screen by coating a paint of the light reflecting substance mixed with the fine particles of the light diffusive material on the substrate having Fresnel surface. The diffusivity of this screen can be varied by changing the shape of the partcles of the light diffusive substance.

Figure 9:
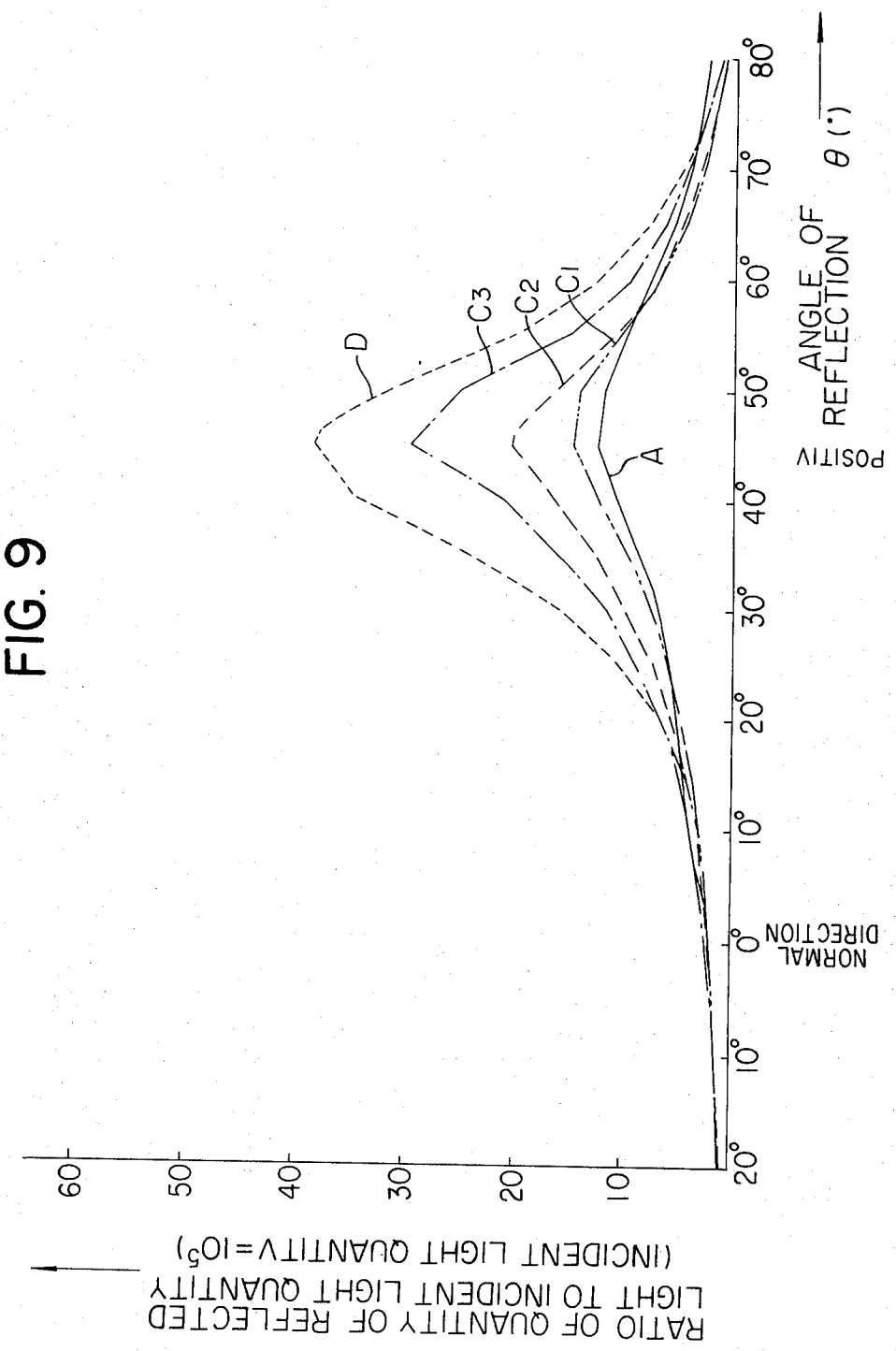
FIG. 9 shows graphs illustrating light orientation characteristics of the screens.

The light orientation characteristics of the light reflected by the screen of the invention are shown in FIG. 9. The measurements were made by assuming 0° the direction of the light reflected to the normal direction of the ring strip surface by applying a definite light at an angle of 45° on one of the ring strips of each screen and by measuring the intensity of the reflected lights received on the plane including said 0° direction light and varying the angle of reflection. Each angle of the reflection is shown in the abscissa and the ratio of quantity of reflected light to incident light quantity relative to the incident light quantity, which is assumed as $10^5$, is shown in the ordinate of FIG. 9. The result were shown in FIG. 9, in which the curve A associates with the screen 223 shown in FIG. 7, curves $C_1$, $C_2$ and $C_3$ and D associates with the screen 23 of FIG. 4. The curves $C_1$, $C_2$ and $C_3$ were obtained by using acrylic resin as a synthetic resin and varying the mixing rate of the aluminum powder and setting the light transmittivity per 0.2 mm of the mixture as about 5%. The aluminum powder is a fine particle of scale shape and the maximum size thereof is about $20\mu$. The curve $C_1$ is obtained by using the aluminum of mixing rate of 0.5 weight%, the curve $C_2$ is obtained by using 1 weight% of aluminum and the curve $C_3$ is obtained by using 2 weight% of aluminum.

The curve D is obtained by using the mixture rate 2:1 of polycarbonate resin relative to acrylic resin, the mixture being the mutually non-soluble resins to which aluminum powder is added at a rate of 0.05% relative to the resin mixture. In FIG. 9, the screen is dark when the peak of the curve is low and the screen is light when the peak of the curve is high. It is preferable to select the screen of good light orientation property which corresponds to the curve having a high peak for preventing the effects of the peripheral light to deteriorate the contrast of the projected light and for observing a high brightness image. However, if the light orientation property is extremely good the field to see the projected image becomes narrow so that it is necessary to suitably control the light orientation property.

According to the screen of FIG. 4, an optional light orientation property can be easily obtained so that a high quality screen is easily produced.

The present invention can be applied not only to film reader but also to reader printer.

What we claim is:

1. A film reader comprising:
   a housing having an observation aperture;
   means for illuminating a film having an image recorded thereon;
   a screen disposed in said housing and in opposition to said observation aperture for allowing an observer to observe from outside said housing an image projected thereon, said screen having a number of concentrically arranged ring strip surfaces having different inclination angles and having increasing diameters away from a common center of said ring strip surfaces, said screen including a diffusion layer having an internal structure comprising mixture of at least two synthetic resin substance melts which are optically transparent and non-soluble with each other and which have different refractive indexes, and said ring strip surfaces being formed on said diffusion layer; and
   optical means, located within said housing, for projecting the image of the film onto said screen.

2. A film reader according to claim 1, in which said diffusion layer further includes fine particles of a light reflecting substance.

3. A film reader comprising:
   a housing having an observation aperture;
   means for illuminating a film having an image thereon;
   a screen disposed in said housing and in opposition to said observation aperture for allowing an observer to observe from outside said housing an image projected thereon, said screen including a diffusion layer having an internal structure comprising a mixture of at least two synthetic resin substance melts which are optically transparent and non-soluble with respect to each other and which have different refractive indexes, said diffusion layer diffusingly reflecting light incident thereinto at the interface between the synthetic resin substances having different refractive indexes, and said screen further including a Fresnel lens provided on the diffusion layer and a rough surface formed on said Fresnel lens; and
   optical means, located within said housing, for projecting the image of the film onto said screen.

4. A reflection type screen for observing an image projected thereon, comprising;

a diffusion layer having an internal structure comprising a mixture of at least two synthetic resin substance melts which are optically transparent and non-soluble with respect to each other and which have different refractive indexes, said diffusion layer diffusingly reflecting light incident thereinto at the interface between the synthetic resin substances having different refractive indexes;

a number of concentrically arranged ring strips having increasing inclination angles and increasing diameters in a direction away from a common center of said ring strips; and rough surfaces formed on said ring strips.

5. A screen according to claim 4, in which said diffusion layer includes fine particles of a light reflecting substance.

6. A reflection type screen, usable with a film reader, for observing an image projected thereon, comprising:

a diffusion layer having an internal structure comprising a mixture of at least two synthetic resin substance melts which are optically transparent and non-soluble with respect to each other and which have different refractive indexes, said diffusion layer diffusingly reflecting light incident thereinto at the interface between the synthetic resin substances having different refractive indexes;

a Fresnel lens provided on one of the surfaces of the diffusion layer; and rough surface formed on said Fresnel lens.

7. A screen according to claim 6, in which said diffusion layer includes fine particles of a light reflecting substance.

8. A screen according to claim 6, in which an optical axis of the Fresnel lens is located off said screen.

9. A film reader comprising:

a housing having an observation aperture;

means for illuminating a film having an image recorded thereon;

a screen disposed in said housing and in opposition to said observation aperture for allowing an observer to observe from outside said housing an image projected thereon, said screen having a number of concentrically arranged ring strip surfaces having different inclination angles and having increasing diameters away from a common center of said ring strip surfaces, which center is located off said screen, the plane of the surface of said screen being disposed at an inclination relative to the horizontal plane and an end of said screen nearest to said common center being located adjacent to the observation aperture; and optical means for projecting the image of the film onto said screen;

said screen including a diffusion layer having an internal structure comprising a mixture of at least two synthetic resin substance melts which are optically transparent and non-soluble with respect to each other and which have different refractive indexes, said diffusion layer diffusingly reflecting light incident thereinto at the interface between the synthetic resin substances having different refractive indexes, and said screen further including a rough surface formed on the diffusion layer.

* * * * *

UNITED STATES PATENT AND TRADEMARK OFFICE
CERTIFICATE OF CORRECTION

PATENT NO. : 4,229,085
DATED : October 21, 1980
INVENTOR(S) : Yu Yamada, et al.

It is certified that error appears in the above-identified patent and that said Letters Patent are hereby corrected as shown below:

Column 1, line 19, after "transmitted" insert --from--

Signed and Sealed this

Third Day of February 1981

[SEAL]

Attest:

RENE D. TEGTMEYER

*Attesting Officer*   *Acting Commissioner of Patents and Trademarks*